(12) United States Patent
Pettit

(10) Patent No.: US 12,494,922 B2
(45) Date of Patent: Dec. 9, 2025

(54) THRESHOLD SIGNATURE SCHEME

(71) Applicant: nChain Licensing AG, Zug (CH)

(72) Inventor: Michaella Pettit, London (GB)

(73) Assignee: nChain Licensing AG, Zug (CH)

( * ) Notice: Subject to any disclaimer, the term of this patent is extended or adjusted under 35 U.S.C. 154(b) by 0 days.

(21) Appl. No.: 18/700,529

(22) PCT Filed: Sep. 26, 2022

(86) PCT No.: PCT/EP2022/076660
§ 371 (c)(1),
(2) Date: Apr. 11, 2024

(87) PCT Pub. No.: WO2023/072504
PCT Pub. Date: May 4, 2023

(65) Prior Publication Data
US 2025/0088367 A1    Mar. 13, 2025

(30) Foreign Application Priority Data

Oct. 26, 2021    (GB) ...................................... 2115390

(51) Int. Cl.
*H04L 9/32*    (2006.01)
*H04L 9/30*    (2006.01)

(52) U.S. Cl.
CPC ............. *H04L 9/3247* (2013.01); *H04L 9/30* (2013.01)

(58) Field of Classification Search
CPC ..... H04L 9/3247; H04L 9/085; H04L 9/0825; H04L 9/30
USPC ........................................ 713/168, 171, 181
See application file for complete search history.

(56) References Cited

U.S. PATENT DOCUMENTS

| | | | |
|---|---|---|---|
| 7,246,232 B2 | 7/2007 | Dutertre | |
| 8,144,874 B2 * | 3/2012 | McGough | H04L 63/062 |
| | | | 713/168 |
| 8,806,197 B2 | 8/2014 | Struik et al. | |
| 9,813,244 B1 | 11/2017 | Triandopoulos et al. | |
| 9,894,151 B2 | 2/2018 | Dhuse et al. | |

(Continued)

FOREIGN PATENT DOCUMENTS

| | | |
|---|---|---|
| JP | 2007124032 A | 5/2007 |
| JP | 2008199278 A | 8/2008 |

(Continued)

OTHER PUBLICATIONS

NPL Search Terms (Year: 2025).*

(Continued)

*Primary Examiner* — Syed A Zaidi
(74) *Attorney, Agent, or Firm* — Messner Reeves LLP

(57)    ABSTRACT

A computer-implemented method of generating a share of a threshold signature, wherein a group of participants comprises a set of target participants and a set of dummy participants, wherein the number of target participants is less than the number of participants required to generate a valid signature, wherein each target participant and each dummy participants has i) a respective share of a first private key, ii) a respective share of an ephemeral private key, iii) a respective share of a first blinding key, iv) a respective share of a second blinding key, and wherein each target participant has v) an ephemeral public key corresponding to the ephemeral private key.

19 Claims, 2 Drawing Sheets

(56) References Cited

U.S. PATENT DOCUMENTS

| | | | |
|---|---|---|---|
| 10,211,981 B2* | 2/2019 | Camenisch | H04L 9/0861 |
| 10,511,436 B1* | 12/2019 | Machani | H04L 9/085 |
| 10,764,043 B2 | 9/2020 | Traynor et al. | |
| 10,903,991 B1 | 1/2021 | Craige et al. | |
| 11,323,267 B1 | 5/2022 | Griffin et al. | |
| 11,481,761 B2 | 10/2022 | Lam | |
| 11,563,567 B2 | 1/2023 | Le Saint | |
| 11,637,708 B2 | 4/2023 | Hung | |
| 11,973,867 B2 | 4/2024 | Tysor et al. | |
| 12,309,196 B2 | 5/2025 | Pettit | |
| 2002/0116611 A1 | 8/2002 | Zhou et al. | |
| 2003/0009694 A1 | 1/2003 | Wenocur et al. | |
| 2003/0059041 A1 | 3/2003 | MacKenzie et al. | |
| 2010/0037055 A1 | 2/2010 | Fazio et al. | |
| 2011/0138192 A1 | 6/2011 | Kocher et al. | |
| 2012/0254619 A1 | 10/2012 | Dhuse et al. | |
| 2014/0164769 A1 | 6/2014 | D'Souza | |
| 2014/0325309 A1 | 10/2014 | Resch et al. | |
| 2015/0100781 A1 | 4/2015 | Yann et al. | |
| 2015/0288525 A1* | 10/2015 | Camenisch | H04L 9/3226 713/180 |
| 2017/0223008 A1* | 8/2017 | Camenisch | H04L 9/085 |
| 2017/0250972 A1* | 8/2017 | Ronda | H04L 9/0891 |
| 2018/0060248 A1 | 3/2018 | Liu et al. | |
| 2018/0074889 A1 | 3/2018 | Resch et al. | |
| 2018/0101697 A1 | 4/2018 | Rane et al. | |
| 2018/0183601 A1 | 6/2018 | Campagna et al. | |
| 2018/0212772 A1 | 7/2018 | Leavy et al. | |
| 2018/0307573 A1 | 10/2018 | Abraham et al. | |
| 2018/0349867 A1 | 12/2018 | Trieflinger | |
| 2018/0351754 A1 | 12/2018 | Wallrabenstein et al. | |
| 2019/0007205 A1 | 1/2019 | Corduan et al. | |
| 2019/0014124 A1 | 1/2019 | Reddy et al. | |
| 2019/0280864 A1 | 9/2019 | Cheng et al. | |
| 2019/0370792 A1 | 12/2019 | Lam | |
| 2019/0372759 A1 | 12/2019 | Rix | |
| 2020/0044863 A1 | 2/2020 | Yadlin et al. | |
| 2020/0074450 A1 | 3/2020 | Fletcher et al. | |
| 2020/0145231 A1 | 5/2020 | Trevethan | |
| 2020/0153640 A1 | 5/2020 | Ranellucci et al. | |
| 2020/0169391 A1 | 5/2020 | Kapp et al. | |
| 2020/0213099 A1 | 7/2020 | Wright | |
| 2020/0213113 A1 | 7/2020 | Savanah et al. | |
| 2020/0259638 A1* | 8/2020 | Carmignani | H04L 9/085 |
| 2020/0259651 A1 | 8/2020 | Mohassel et al. | |
| 2020/0311678 A1 | 10/2020 | Fletcher et al. | |
| 2020/0353167 A1 | 11/2020 | Vivek et al. | |
| 2021/0049600 A1 | 2/2021 | Spector et al. | |
| 2021/0067345 A1 | 3/2021 | Shamai et al. | |
| 2021/0089676 A1 | 3/2021 | Ford et al. | |
| 2021/0090072 A1 | 3/2021 | Sewell et al. | |
| 2021/0352054 A1 | 11/2021 | Urian | |
| 2021/0359843 A1 | 11/2021 | Li et al. | |
| 2021/0377049 A1 | 12/2021 | Nix | |
| 2022/0172180 A1 | 6/2022 | Komiyama | |
| 2022/0182235 A1 | 6/2022 | Tysor et al. | |
| 2022/0239509 A1 | 7/2022 | Jang et al. | |
| 2022/0286276 A1 | 9/2022 | Li et al. | |
| 2022/0311623 A1 | 9/2022 | Tomlinson et al. | |
| 2022/0321340 A1 | 10/2022 | Tsitrin et al. | |
| 2023/0066711 A1 | 3/2023 | Wright et al. | |
| 2023/0361993 A1 | 11/2023 | Camenisch et al. | |
| 2024/0054206 A1 | 2/2024 | Belgarric et al. | |

FOREIGN PATENT DOCUMENTS

| | | |
|---|---|---|
| JP | 2013513312 A | 4/2013 |
| JP | 2015194959 A | 11/2015 |
| JP | 2018005089 A | 1/2018 |
| WO | 9937052 A1 | 7/1999 |
| WO | 2015160839 A1 | 10/2015 |
| WO | 2017145010 A1 | 8/2017 |
| WO | 2018189656 A1 | 10/2018 |
| WO | 2019034951 A1 | 2/2019 |
| WO | 2019034986 A1 | 2/2019 |
| WO | 2019158209 A1 | 8/2019 |
| WO | 2019193452 A1 | 10/2019 |
| WO | 2019246206 A1 | 12/2019 |
| WO | 2020084418 A1 | 4/2020 |
| WO | 2021213959 A1 | 10/2021 |
| WO | 2021254702 A1 | 12/2021 |
| WO | 2023072502 A1 | 5/2023 |

OTHER PUBLICATIONS

Boldyreva, Alexandra. "Threshold signatures, multisignatures and blind signatures based on the gap-Diffie-Hellman-group signature scheme." International Workshop on Public Key Cryptography. Berlin, Heidelberg: Springer Berlin Heidelberg, 2002. (Year: 2002).*

Camenisch, Jan, et al. "Short threshold dynamic group signatures." International conference on security and cryptography for networks. Cham: Springer International Publishing, 2020 (Year: 2020).*

Cachin Christian, "Security and Fault-tolerance in Distributed Systems—Distributed Cryptography", Dec. 31, 2012 (Dec. 31, 2012), XP055903112, Retrieved from the Internet: URL: https://cachin.com/cc/sft12/distcrypto.pdf, sections 7.2, 7.3, 7.4.

Combined Search and Examination Report for Application No. GB2009062.7, mailed on Mar. 12, 2021, 10 pages.

Combined Search and Examination Report under Sections 17 and 18(3) for Application No. GB2011686.9, mailed on Apr. 22, 2021, 10 pages.

Combined Search and Examination Report under Sections 17 and 18(3) for Application No. GB2017103.9 mailed on Jun. 28, 2021, 13 pages.

Combined Search and Examination Report under Sections 17 and 18(3) for Application No. GB2105992.8 mailed on Jan. 17, 2022, 9 pages.

Combined Search and Examination Report under Sections 17 and 18(3) for Application No. GB2111440.0 mailed on Jan. 25, 2022, 6 pages.

Combined Search and Examination Report under Sections 17 and 18(3) for Application No. GB2111441.8 mailed on Jan. 25, 2022, 6 pages.

Combined Search Report under Sections 17 for Application No. GB2111442.6 mailed on Jan. 25, 2022, 4 pages.

Damgard I., et al., "Fast Threshold ECDSA with Honest Majority", Aug. 23, 2020, Computer Vision—ECCV2020: 16th European Conference, Proceedings; Part of the Lecture Notes in Computer Science, 35 pages.

Denis Kolegov et al: "Towards Threshold Key Exchange Protocols", Arxiv.Org, Cornell University Library, 201 Olin Library Cornell University Ithaca, Ny 14853, Dec. 27, 2020 (Dec. 27, 2020), XP081849900, section 2.2.

Ewa Syta et al: "Keeping Authorities "Honest or Bust" with Decentralized Witness Cosigning", 2016 IEEE Symposium On Security and Privacy (SP), May 1, 2016 (May 1, 2016), pp. 526-545.

Fornaro D., "Elliptic Curve Hierarchical Deterministic Private Key Sequences: Bitcoin Standards and BestPractices," Master Thesis, Apr. 19, 2018, retrieved from the URL: https://www.politesi.polimi.it/bitstream/10589/140112/1/2018_04_Fornaro.pdf, 53 pages.

GB2101590.4 Combined Search and Examination Report dated Jul. 30, 2021, 7 pages.

Gennaro R., et al., "Fast Multiparty Threshold ECDSA with Fast Trustless Setup," Proceedings of the 2018 ACM SIGSAC Conference on Computerand Communications Security, Oct. 2018, pp. 1179-1194.

Gennaro R., et al., "Robust Threshold DSS Signatures," International Conference on the Theory and Applications of Cryptographic Techniques, 2001, vol. 164, pp. 54-84.

Goldfeder S., et al., "Securing Bitcoin Wallets via Threshold Signatures," 2014, retrieved from the URL: https://www.cs.princeton.edu/stevenag/bitcoin_threshold_signatures.pdf, sections "Threshold ECDSA Signature Generation" and "Threshold Deterministic Address Derivation", 11 pages.

International Search Report and Written Opinion for Application No. PCT/EP2021/062941, mailed on Aug. 3, 2021, 14 pages.

(56) References Cited

OTHER PUBLICATIONS

International Search Report and Written Opinion for Application No. PCT/EP2021/076686 mailed on Feb. 14, 2022, 17 pages.
International Search Report and Written Opinion for Application No. PCT/EP2022/058085 mailed on Jul. 26, 2022, 14 pages.
International Search Report and Written Opinion for Application No. PCT/EP2022/069246 mailed on Nov. 3, 2022, 15 pages.
International Search Report and Written Opinion for International Application No. PCT/EP2022/076636, mailed Jan. 20, 2023, 12 pages.
International Search Report and Written Opinion issued in International Application No. PCT/EP2021/067673, mailed on Sep. 28, 2021, 13 pages.
Joonsang Baek et al: "Simple and efficient threshold cryptosystem from the gap diffie-hell ma n group", GLOBECOM '03. 2003-IEEE Global Telecommunications Conference. Conference Proceedings. San Francisco, CA, Dec. 1-5, 2003; [IEEE Global Telecommunications Conference] New York, NY, vol. 3, Dec. 1, 2003 (Dec. 1, 2003), pp. 1491-1495.
Luzio A.D., et al., "Arcula: A Secure Hierarchical Deterministic Wallet for Multi-asset Blockchains," Section 2, Dec. 10, 2019, 33 pages.
PCT/EP2022/050116 International Search Report and Written Opinion dated Apr. 26, 2022, 14 pages.
Pettit M. "Shared Secrets and Threshold Signatures," May 1, 2020, [retrieved on Jun. 14, 2021], pp. 1-23, Retrieved from the Internet: URL: https://nakasendoproject.org/Threshold-Signatures-whitepaper-nchain.pdf, sections 4 and 5; p. 22.
Pramanik S., et al., "Vpss: A Verifiable Proactive Secret Sharing Scheme in Distributed Systems," IEEE Military Communications Conference, Milcom, Oct. 13, 2003, vol. 2, pp. 826-831, XP010698401, DOI: 10.1109/MILCOM.2003.1290219, ISBN: 978-0-7803-8140-7.
Wuille P., "BIP 32: Hierarchical Deterministic Wallets," Github Bitcoin BIPs, Feb. 2012, 6 pages, Retrieved from the Internet: URL: https://en.bitcoin.it/wiki/BIP_0032, Retrieved on Aug. 24, 2020.
Hideyuki F., et al., "Updating Method of Distributed Data in Secret Sharing System," Research Report of Computer Security (CSEC), Japan, Information Processing Society of Japan, May 15, 2014, vol. 2014-CSEC-65, No. 1, pp. 1-6, 10 pages.
Shingu T., et al., "Updating Method of Verifiable Distributed Data in the Secret Sharing Scheme," Japan, Information Processing Society of Japan, Nov. 28, 2014, vol. 2014-CSEC-67, No. 5, pp. 1-6, 9 pages.
Dikshit, P. et al.,. Efficient Weighted threshold ECDSA for securing Bitcoin Wallet, 2016, pp. 43-51, Accents Transactions on Information Security, 2(6).
GB2115390.3 Combined Search and Examination Report dated Jul. 14, 2022, 10 pages.
Gennaro, R, et al., "Robust threshold DSS signatures." International Conference on the Theory and Applications of Cryptographic Techniques, pp. 354-371, 1996, Springer, Berlin, Heidelberg.
PCT/EP2022/076660 International Search Report and Written Opinion dated Jan. 9, 2023, 13 pages.
Courtois N.T., et al., "Stealth Address and Key Management Techniques in Blockchain Systems," Proceedings of the 3rd International Conference on Information Systems Security and Privacy (ICISSP 2017), Feb. 21, 2017, pp. 559-566.

* cited by examiner

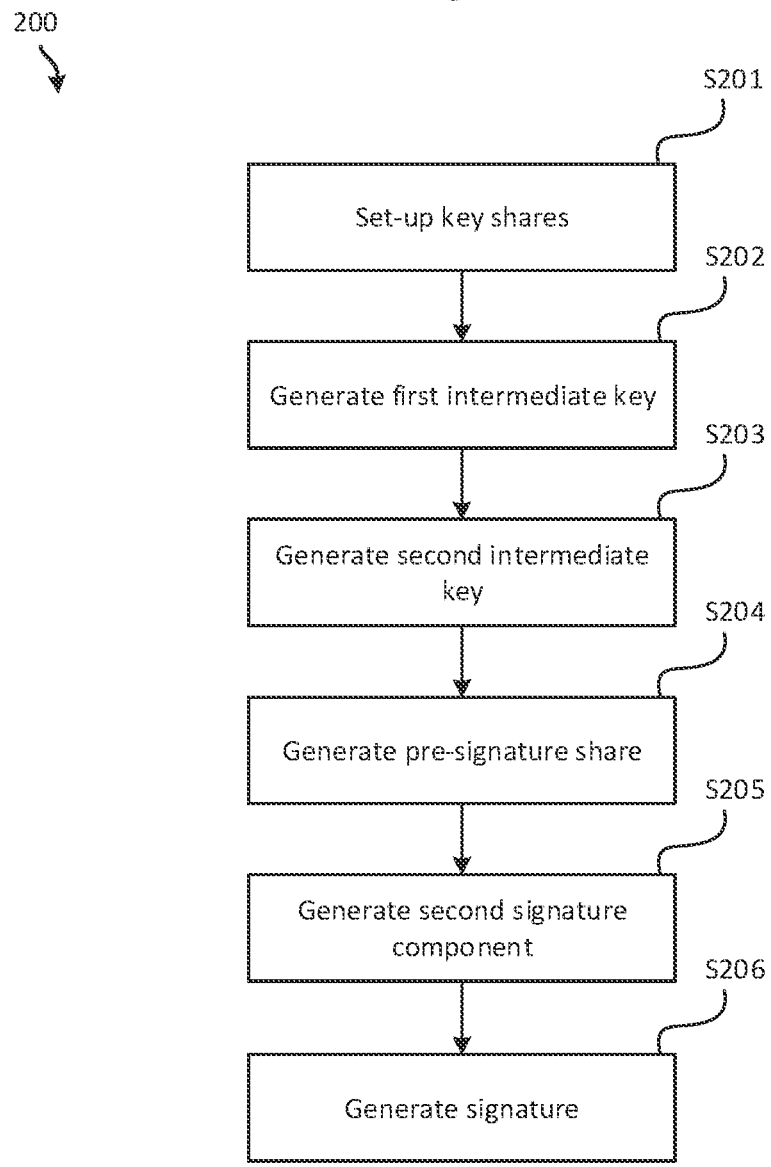

THRESHOLD SIGNATURE SCHEME

CROSS REFERENCE TO RELATED APPLICATIONS

This application is the U.S. National Stage of International Application No. PCT/EP2022/076660 filed on Sep. 26, 2022, which claims the benefit of United Kingdom Patent Application No. 2115390.3, filed on Oct. 26, 2021, the contents of which are incorporated herein by reference in their entireties.

TECHNICAL FIELD

The present disclosure relates to a method of generating shares of a threshold digital signature.

BACKGROUND

Public-key cryptography is a type of cryptographic system that uses pairs of keys: private keys which are known only to the owner of the private key, and public keys which are generated based on the corresponding private key and which may be disseminated without compromising the security of the private key.

Public-key cryptography enables a sender to encrypt a message using a recipient's public key (i.e. the public key corresponding to a private key known only to the recipient). The encrypted message can then only be decrypted using the recipient's private key.

Similarly, a sender can use their own private key to sign a message, e.g. to prove that the message is being sent by the sender, and/or to indicate that the sender agrees with the message. The signer (i.e. the party generating the signature) uses their private key to create a digital signature based on the message. Creating a digital signature based on a message means supplying the message and private key to a function that generate the signature based on both the message and private key. The signature is added to (e.g. tagged onto) the message or otherwise associated with the message. Anyone with the signer's corresponding public key can use the same message and the digital signature on the message to verify whether the signature was validly created, i.e. whether the signature was indeed made using the signer's private key. As well as ensuring the authenticity of a message, digital signatures also ensure the integrity and non-repudiation of the message. That is, a digital signature can be used to prove that a message has not been changed since it was signed with the signature, and that the creator of a signature cannot deny in the future that they created the signature.

A digital signature scheme typically involves three procedures, i.e. algorithms. A key generation algorithm is used to generate a random private key and a corresponding public key. A signing algorithm is used to generate a signature based on a message and the private key. A verification algorithm is used to verify, given a public key and the message, whether the signature has been generated using the corresponding private key and according to the signing algorithm.

In general, a shared secret may be used to share a data item that is distributed amongst a group of participants. Each participant has a different share of the secret. Normally, the secret can only be reconstructed when a certain number (referred to as the "threshold") of participants make their respective shares available, e.g. to be combined together to calculate the secret. A common use of a shared secret is as a shared private key of a private-public key pair. That is, the private key may be distributed amongst a group of participants such that no single participant has access to the private key. Therefore no single participant can generate a valid signature of a message. Instead, some or all of the participants must together generate the private key in order for the signature to be generated.

Instead of the participants sharing their private key shares in order to generate a signature, they may instead use a threshold signature scheme. A threshold signature scheme allows a threshold number of participants in a group to create a digital signature based on a message using individual shares of a shares private key, without the private key being made available to any one participant. Here, a digital signature is a signature which is generated based on the message to be signed. In such a scheme, the signature can only be created if the threshold number of participants agree to generate the signature on the message. Any attempt to generate a signature using a smaller number of participants will not generate a valid signature. Therefore, a valid signature by the group (i.e. one generated using the message and the shared private key) provably had the threshold number of people agree to generate the signature. This also implies that any adversary needs to obtain the threshold number of shares of the private key to forge a signature with that private key.

A threshold signature scheme is said to be threshold-optimal if the threshold for generating a valid signature is the same as the threshold of the shared private key.

SUMMARY

A threshold signature scheme requires a threshold number of participants to contribute, i.e. participate, to generate a valid signature. E.g. a threshold number of signature shares must be contributed by a group of participants. Although only the threshold number of signature shares are required to generate a valid signature, some signature schemes require more than the threshold number of participants in order to be able to calculate those signature shares. That is, a signature share may be generated based on values that can only be computed with more than the threshold number of participants. As an example, the threshold of the threshold signature may be t+1, whereas at least 2t+1 participants are required to generate a signature share, or at least one or more values upon which the signature share is based. In this case, it may not be possible for a given group of participants to make use of the threshold signature scheme. It would therefore be desirable to provide a technique that would allow smaller groups to make use of such signature schemes.

According to one aspect disclosed herein, there is provided a computer-implemented method of generating a share of a threshold signature, wherein a group of participants comprises a set of target participants and a set of dummy participants, wherein the number of target participants is less than the number of participants required to generate a valid signature, wherein each target participant and each dummy participants has i) a respective share of a first private key, ii) a respective share of an ephemeral private key, iii) a respective share of a first blinding key, iv) a respective share of a second blinding key, and wherein each target participant has v) an ephemeral public key corresponding to the ephemeral private key, and wherein the method is performed by a first one of the target participants and comprises: generating a first component of the threshold signature based on the ephemeral public key; generating a respective share of a first intermediate key based on the respective share of the ephemeral private key and the respective share of the first blinding key, and obtaining a respective share of the first intermediate key from each other target participant and each dummy participant; generating the first intermediate key based on the respective shares of the first intermediate key; generating a respective share of an inverse ephemeral private key based on an inverse of the first intermediate key and the respective share of the first blinding key; generating a respective share of a second intermediate key based on the respective share of the first private key, the respective share of the first blinding key, and the respective share of the second blinding key, and obtaining a respective share of the second intermediate key from each other target participant and each dummy participant; generating the second intermediate key based on the respective shares of the second intermediate key; generating a respective share of a pre-signature value based on the first component of the threshold signature, the inverse of the first intermediate key, the second intermediate key and the respective share of the second blinding key; and generating a respective second component of the threshold signature based on the respective share of the inverse ephemeral private key, the respective share of the pre-signature value, and a message.

The present disclosure enables a set of target participants to compute a valid signature, regardless of the number of target participants, including if the number of target participants is less than the number of participants required by the signature scheme. The present disclosure makes use of "dummy participants". These are participants that contribute certain data items (e.g. keys) in order for the target participants to be able to calculate other data items that are required by the scheme but cannot be generated by the set of target participants alone. In other words, the disclosure enables the target participants to replicate a scheme where the size of the set of target participants is less than the group size required by the scheme. The method is such that the target participants are able to generate a valid signature share, but the dummy participants are not.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 2 shows an example method for generating a threshold signature.

DETAILED DESCRIPTION OF EMBODIMENTS

1. Cryptographic Concepts

Figure 1:
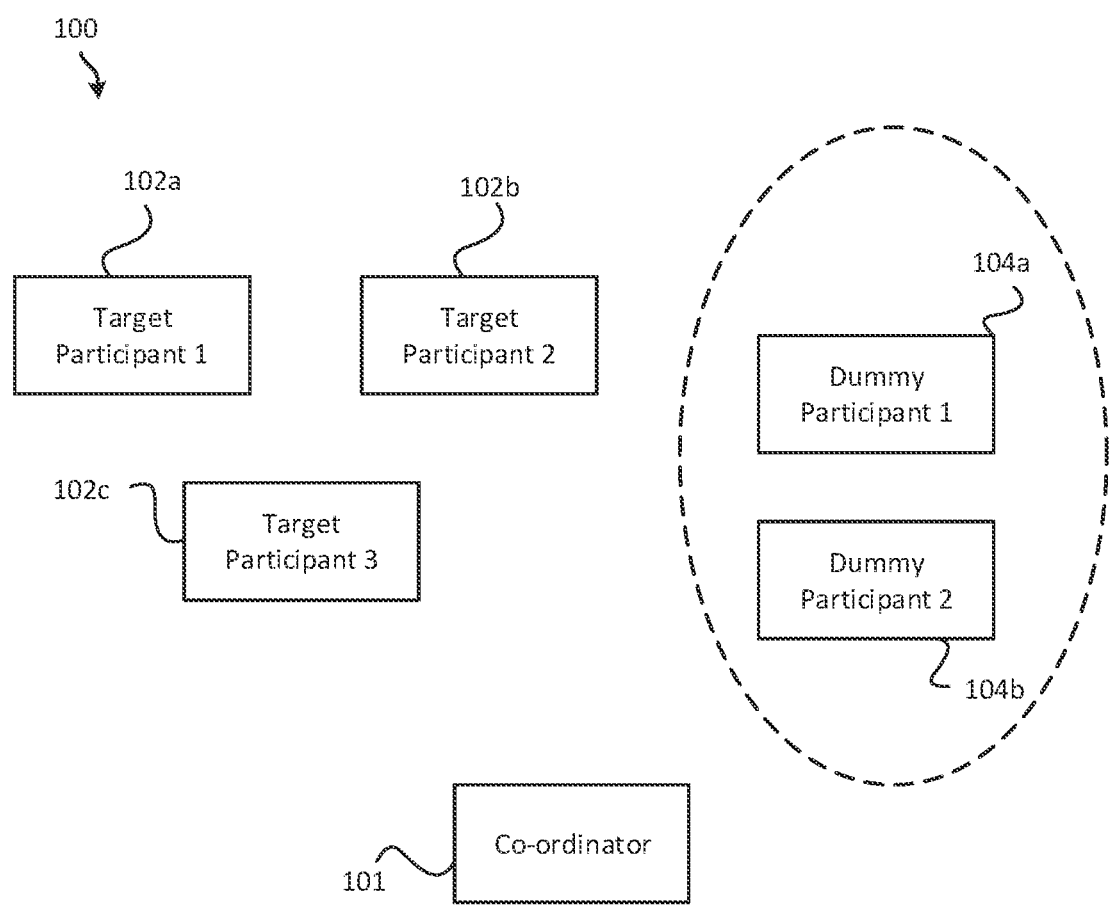
FIG. 1 schematically illustrates an example system for generating a threshold signature.

Whilst the following examples are described in terms of elliptic curve cryptography, the invention is not limited to any one particular cryptographic scheme and may in general be applied to any cryptographic scheme, e.g. RSA or other public key cryptography schemes.

1.1 Elliptic Curve Groups

An elliptic curve E satisfies the equation:

$$y^2 = x^3 + ax + b \bmod p$$

where $a, b \in \mathbb{Z}_p$ and a, b are constants satisfying $4a^3 + 27b^2 \neq 0$. The group over this elliptic curve is defined to be the set of elements (x,y) satisfying this equation along with the point at infinity $\mathcal{O}$, which is the identity element. The group operation on the elements in this group is called elliptic curve point addition and denoted by +. This group is denoted by $E(\mathbb{Z}_p)$ and its order by n.

This group operation can be used to define another operation on the elements called point multiplication denoted by ·. For a point $G \in E(\mathbb{Z}_p)$ and a scalar $k \in \mathbb{Z}^*_n$, the point k·G is defined to be the point G added to itself k times.

In elliptic curve cryptography, a private key is defined to be a scalar $k \in \mathbb{Z}_n \setminus \{0\}$ where $\mathbb{Z}_n \setminus \{0\}$ is notation for the set $\{1, \ldots, n-1\}$, and the corresponding public key is the point k·G on an elliptic curve. For instance, in some blockchain protocols, the elliptic curve is chosen to be the secp256k1 elliptic curve, and the values a, b, and p are completely specified by this curve. The order n of this group has been calculated given these values, which in the case of this curve is a prime, and the secp256k1 standard also specifies a point G which is to be used as the generator of this group.

1.2 Elliptic Curve Digital Signature Algorithm

In order to create a signature on a message msg, with the private key a, the following steps are taken:

1. Calculate the message digest e=hash(msg), where may be any hash function. For instance, in some examples hash(msg)=SHA256(SHA256(msg)) where SHA256 (■) is the SHA-256 hash function. Note that instead the message may be hashed only once, or more that two times with the same or different hash functions.
2. Chose a random integer $k \in \{1, \ldots, n-1\}$, where n is the order of the elliptic curve, e.g. the secp256k1 curve. In the following, k is referred to as the ephemeral private key.
3. Calculate the ephemeral public key corresponding to this ephemeral private key k·G=$(R_x, R_y)$.
4. Calculate r=Rx mod n. If r=0, return to step 2.
5. Calculate the multiplicative inverse of the ephemeral key $k^{-1}$ mod n.
6. Calculate s=$k^{-1}$(e+ar) mod n. If s=0, return to step 2.
7. The signature on the message msg is (r,s).

The ephemeral key must be kept secret, otherwise the private key can be calculated, given a message and signature. Additionally, each time a signature is generated, a different ephemeral key must be used. If this is not the case, it is possible to derive the private key a given two different signatures and their corresponding messages.

Given a message msg, a public key P=a·G, and corresponding signature (r,s), then one can verify the signature by completing the following steps:

1. Calculate the message digest e=hash(msg), e.g. e=SHA256(SHA256(msg)).
2. Calculate the multiplicative inverse $s^{-1}$ of s modulo n.
3. Calculate $j_1 = es^{-1}$ mod n and $j_2 = rs^{-1}$ mod n.
4. Calculate the point Q=$j_1$·G+$j_2$·P.
5. If Q=$\mathcal{O}$, the point at infinity, the signature is invalid.
6. If Q≠$\mathcal{O}$, then let Q=$(Q_x, Q_y)$, and calculate u=$Q_x$ mod n. If u=r, the signature is valid.

In threshold signature schemes, this private key a is split into key shares that are distributed amongst participants in a threshold scheme group.

1.3 Joint Verifiable Random Secret Sharing

Assume that N participants want to create a joint secret that can only be regenerated by at least (t+1) of the participants in the scheme. To create the shared secret, the following steps are taken:

1. The participants agree on the unique label i for each participant. Each participant i generates (t+1) random numbers $$a_{ij} \in_R \mathbb{Z}_n \backslash \{0\}, \forall\ j = 0, \ldots, t,$$

where $\in_R$ means a randomly generated element of the set $\mathbb{Z}_n \backslash \{0\}$ where $\mathbb{Z}_n \backslash \{0\}$ is notation for the set $\{1, \ldots, n-1\}$. Then each participant has a secret polynomial of order t $$f_i(x) = a_{i0} + a_{i1}x + \ldots + a_{it}x^t \bmod n,$$

for i=1, ..., N. Note that we omit the mod n notation from now on, and it is assumed that all arithmetic operations over integers are done modulo n.

2. Each participant i sends the value $f_i(j)$ to participant j e.g. using a secure communication channel with participant j only.
3. Each participant i calculates their own private secret share of a shared secret polynomial as $$a_i := \sum_{j=1}^{N} f_j(i).$$

A shared secret share is a point with the form $(i, a_i)$, where i is the participants label in the scheme. This method for creating a secret share of a, as described in steps 1-3, is denoted herein by $a_i$=JVRSS(i) for participant i. Note that "JVRSS" typically stands for "Joint verification random secret sharing" and includes steps 4 and 5 as well. However, throughout this document JVRSS is taken to mean performing at least steps 1 to 3, where steps 4 and 5 are optional steps.

Now that the participants have generated a shared polynomial, they can each verify that the other participants have shared the correct information to all participants, and that all participants have the same shared polynomial. This is done in the following way.

4. Each participant i broadcasts to all participants the obfuscated coefficients $a_{ik} \cdot G,$ for k=0, ..., t.
5. Each participant i checks that each participant j has correctly calculated the polynomial point $f_j(i)$ by calculating $f_j(i) \cdot G$ and verifying that $$f_j(i) \cdot G \stackrel{?}{=} \sum_{k=0}^{t} i^k (a_{jk} \cdot G) \quad \forall\ j = 1, \ldots, N.$$

If all participants find that this equation holds for each polynomial, then the group can collectively be sure that they have all created the same shared polynomial.

1.4 Reconstructing a Shared Secret

Assume a participant wants to reconstruct a shared secret a which is the zeroth order of a shared polynomial. Given (t+1) points on this polynomial of the form $$(1, a_1), \ldots, ((t+1), a_{t+1}),$$

then to find the shared secret a, one calculates $$\text{interpolate}(a_1, \ldots, a_{t+1}) = \left( \sum_{l=1}^{t+1} a_l \prod_{\substack{1 \le j \le (t+1),\\ j \ne l}} (-j)(l-j)^{-1} \right) = a,$$

which is derived from a general formula known as "Lagrange Interpolation".

1.5 Public Key Calculation

Given the N zeroth-order private polynomial coefficient public keys $a_{i0} \cdot G$ for i=1, ..., N shared in step 4 of JVRSS, each participant calculates the shared public key P using $$P = a \cdot G = \sum_{j=1}^{N} a_{j0} \cdot G,$$

corresponding to the shared secret a.

1.6 Addition of Shared Secrets

To calculate the addition of two shared secrets that are shared amongst a group of N participants, where each secret polynomial has order t, without any entity knowing the individual secrets, the following steps are taken:

1. Generate the first shared secret a, where participant i's share is given by $a_i$=JVRSS(i) for i=1, ..., N with a threshold of (t+1).
2. Generate the second shared secret b, where participant i's share is given by $b_i$=JVRSS(i), with a threshold of (t+1).
3. Each participant i calculates their own additive share $$v_i = a_i + b_i \bmod n.$$

4. All participants broadcast their additive share $v_i$ to all other participants.
5. Each participant interpolates over at least (t+1) of the shares $v_i$ to calculate $$v = \text{interpolate}(v_1, \ldots, v_{t+1}) = a + b.$$

This method for the addition of shared secrets is denoted by ADDSS(i) for participant i, which results in each participant i knowing v=(a+b).

1.7 Product of Shared Secrets

To calculate the product of two shared secrets that are both shared amongst a group of N participants, where each secret polynomial has order t, the group takes the following steps:

1. Generate the first shared secret a, where participant i's share is given by $a_i$=JVRSS(i) for i=1, ..., N. The shared secret polynomial has order t, meaning (t+1) participants are required to recreate it.
2. Generate the second shared secret b, where participant i's share is given by $b_i$=JVRSS(i), and the shared secret polynomial again has order t.
3. Each participant calculates their own multiplicative share $\mu_i$ using $\mu_i = a_i b_i$.

4. All participants broadcast their multiplicative share $\mu_i$ to all other participants.

5. Each participant interpolates over at least (2t+1) of the shares $\mu_i$ at 0 to calculate $$\mu = \text{interpolate}(\mu_1, \ldots, \mu_{2t+1}) = ab.$$

This method for calculating the product of two shared secrets is denoted herein by $\mu=ab=\text{PROSS}(i)$ for participant i.

1.8 Inverse of a Shared Secret

In order to calculate the inverse of a shared secret a, the following steps are taken:
1. All participants calculate the product of shared secrets PROSS(i), the result of which is $\mu=ab \mod n$.
2. Each participant calculates the modular inverse of $\mu$ which results in $$\mu^{-1} = (ab)^{-1} \mod n.$$

3. Each participant i calculates their own inverse secret share by calculating $$a_i^{-1} = \mu^{-1} b_i.$$

This method for calculating the inverse of shared secrets is denoted by $a_i^{-1}=\text{INVSS}(i)$ for participant i.

1.9 Shared Private Key Generation and Verification

To calculate a shared private key a between $N \geq 2t+1$ participants, t+1 of which are required to create a signature, the participants execute JVRSS with a threshold of t+1 and public key calculation as described above. The result is that every participant i=1, ..., N has a private key share $a_i$ and the corresponding shared public key $P=(a \cdot G)$.

1.10 Ephemeral Key Shares Generation

To generate ephemeral key shares and the corresponding r, as is required in a signature, a group of size N with a shared private key a of threshold (t+1) execute the following steps:
1. Generate the inverse share of a shared secret $k_i^{-1}=\text{INVSS}(i)$, where (t+1) shares are required to recreate it.
2. Each participant calculates $$(x, y) = \sum_{i=1}^{N} (k_{i0} \cdot G),$$

using the obfuscated coefficients shared in the verification of $k_i$, then they calculate $$r = x \mod n.$$

3. Each participant i stores $(r, k_i^{-1})$.

1.11 Addition of Secrets with Different Thresholds

In the case of addition of secrets of order t and t', the addition of the two secrets requires max(t, t')+1 number of shares to calculate it. The reason behind this is that the addition step of the shares of the shared secrets creates a share of a new polynomial. This new additive polynomial is equivalent to the result of the addition of the individual polynomials of the two shared secrets. Adding two polynomials is adding the corresponding coefficients at each order of x. Therefore, the order of the additive polynomial must be the same order as the highest order of the two polynomials. This can be generalised to the addition of more than two polynomials, where the order of the resulting polynomial is the same as the order of the highest order individual polynomial.

Once the addition of two secrets with different thresholds has been calculated, the security of the higher threshold secret is reduced. This is because if one now knows the result (a+b) with respective thresholds t, t' and assume that t<t', then one can calculate a with t shares, and then calculate (a+b)−a=b, and so the value b has been calculated with only t shares. This lower threshold is referred to below as the 'implicated threshold' of b.

1.12 Multiplication of Secrets With Different Thresholds

In the case of multiplication of two secrets with a threshold of t and t', the calculation of the multiplication requires t+t'+1 shares. In this case, the multiplication of shares of two polynomials results in a share on a new polynomial. This new polynomial is the result of multiplying the two individual polynomials and so the order of the result is the addition of the order of the two individual polynomials.

Multiplication can also be generalised to any number of shared secrets, with the resulting threshold being the sum of the individual thresholds plus 1, $\Sigma_\rho t_\rho+1$, where $\rho$ runs over the individual shared secrets.

Similar to addition, the multiplication of two secrets with different thresholds results in an implicated threshold of the higher threshold secret. As before, if ab is known where a has a threshold of t and b has a threshold of t', and t<t', then both a and b can be calculated with t shares. First, one can calculate a and using $(ab)a^{-1}$ find b with only t shares of a secret.

1.13 Combining the Addition and Multiplication of Shared Secrets in One Step It is possible to generalise the above to calculate any combination of addition and multiplication in one step. Assume a group of N participants want to calculate the result ab+c, where a, b, c are shared secrets with thresholds $(t_a+1)$, $(t_b+1)$, $(t_c+1)$ respectively. There is a condition which is $\max(t_a+t_b, t_c)<N$, that is, the number of participants of the scheme must be greater than the maximum between the order of the secret c and the order of the result of the multiplication of the secrets a and b.

1. Each participant i calculates their secret shares $a_i=\text{JVRSS}(i)$, $b_i=\text{JVRSS}(i)$, $c_i=\text{JVRSS}(i)$ with thresholds $(t_a+1)$, $(t_b+1)$, $(t_c+1)$ respectively.
2. Each participant i calculates the share $\lambda_i=a_i b_i+c_i$.
3. Each participant i shares the result $\lambda_i$ with the other participants.
4. Each participant interpolates over $\max(t_a+t_b, t_c)+1$ shares to find the result $$\lambda = \text{int}(\lambda_1, \ldots, \lambda_i, \ldots) = ab + c.$$

This is done in the calculation of a shared signature according to some embodiments below. That is, there is an interpolation over $s_i=k_i^{-1}(e+a_i r)$. This is essentially the case above with $a_i b_i=k_i^{-1} a_i r$ and $c_i=k_i^{-1} e$. In this case $t_a+t_b=2t$ and $t_c=t$, and interpolation is over $\max(t_a+t_b, t_c)+1=2t+1$ shares.

2. Generating Signatures

FIG. 1 illustrates an example system 100 for generating signature shares. As shown, the system 100 comprises a plurality (i.e. group) of participants (e.g. users, machines, etc.) 102, 104. The group of participants is made up of two distinct sets of participants: a set of target participants 102*b* and a set of dummy participants 104. The target participants are those that will generate a respective signature share, or at least will be able to generate a respective signature share.

In contrast, the dummy participants are not able to generate a respective signature share, hence the term "dummy". The terms "target participants" and "dummy participants" could be replaced with "first participants" and "second participants", for instance. That is, the terms are merely labels for the two sets of participants. A participant may also be referred to as a party or an entity. Each of the participants 102, 104 operates respective computing equipment.

Each of the respective computing equipment of the respective participants 102, 104 comprises respective processing apparatus comprising one or more processors, e.g. one or more central processing units (CPUs), accelerator processors (GPUs), application specific processors and/or field programmable gate arrays (FPGAs). The respective computing equipment may also comprise memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive. The respective computing equipment may comprise at least one user terminal, e.g. a desktop or laptop computer, a tablet, a smartphone, or a wearable device such as a smartwatch. Alternatively or additionally, the respective computing equipment may comprise one or more other networked resources, such as cloud computing resources accessed via the user terminal (the cloud computing resources comprising resources of one or more physical server devices implemented at one or more sites). It will be appreciated that any act described as being performed by a party of the system 100 may be performed by the respective computing apparatus operated by that party.

Each of the participants 102, 104 are configured to transmit data to one, some or all of the other participants 102, 104 over the internet using a LAN or WAN connection, or via alternative wired or wireless communication means. Unless the context requires otherwise, reference to a participant 102 transmitting data may be understood as transmitting data to other participants 102 individually, e.g. via a secure communication channel between two participants, or broadcasting to the group as a whole, e.g. via email or other means. Again, unless the context requires otherwise, each participant 102, 104 may transmit data in raw form, or in encrypted form. For instance, the data may be encrypted using a public key of a recipient participant before being send to that recipient participant.

In FIG. 1, the set of target participants contains three participants 102a, 102b, 102c, and the set of dummy participants contains two participants 104a, 104b (shown enclosed by a dotted circle). It will be appreciated that this is just for illustrative purposes, and in general each set may contain any number of participants. Note that unless the context requires otherwise, "first", "second", and so on are used merely as distinguishing labels, and do not necessarily imply an order, hierarchy, or the like.

The system 100 also comprises a coordinator 101. The coordinator may be one of the target participants, e.g. the first target participant 102a. Alternatively, the coordinator 101 may be a separate entity. The coordinator operates respective computer equipment as described above with reference to the participants 102, 104. The coordinator 101 is the party that initiates the signature using a threshold number of signature shares generated by respective target participants 102 (described below). That is, the coordinator 101 generates the signature on (i.e. for) a message to be signed. Again, note that generating a signature on a message is taken to mean that a signature is dependent on the message to be signed, or put another way, the signature is a function of the message to be signed. The coordinator 101 may also be the party that sends the signature, and optionally the message, to a third party 103 or otherwise outputs the signature. For instance, the third party 103 may be a certificate authority or other form of authority, or another user. In other examples, the signature may be recorded, e.g. in a database or other document. In some examples, the signature may be made available to the public, e.g. recorded on a website or other publicly accessible medium, such as a blockchain.

The coordinator 101 may transmit a message to be signed to the target participants 102. The message may be transmitted to all of the participants 102, or to a subset of the participants, e.g. the threshold number of target participants. The coordinator 101 may transmit the message to one participant who then forwards the message to one, some or all of the other target participants 102. The message may be transmitted over the internet using a LAN or WAN connection, or via alternative wired or wireless communication means. The message may be transmitted to each participant 102 individually, e.g. via a secure communication channel between the coordinator 101 and each participant 102, or broadcast to the set of target participants as a whole, e.g. via email or other means. The message may be transmitted in raw form, or in obfuscated form. For instance, the message may be encrypted, or may be hashed one or more times.

One or more of the target participants 102 may obtain the message via alternative means, i.e. not from the coordinator 101. For example, the message may be generated by one of the target participants 102, or otherwise available, e.g. publicly. One or more target participants 102 may receive the message from a third party 103. A target participant 102 that obtains the message may transmit the message (in raw or encrypted form) to one or more other target participants 102. For instance, the first target participant 102 may transmit the message to the other target participants.

Each of the participants 102, 104, both target and dummy, has (e.g. stores in memory) a respective share of a shared private key. The shared private key is a number, such as a 256 bit integer. Similarly, any key referred to below is also a number. The shared private key may have a threshold of t+1.

Techniques for generating shares of a private key will be familiar to the skilled person. As an illustrative example, each participant may participate in a joint verifiable secret sharing scheme (JVRSS) to generate a respective share of the shared private key. For instance, the first target participant 102a may be configured to generate a first private key share $a_1$ of a private key a using the JVRSS technique described above. That is, the first target participant 102a may have an index of 1, and generate the first private key share using $a_i$=JVRSS(1) for participant 1, where the private key is denoted by a. Each participant 102, 104 may generate a respective private key share $a_i$. For instance, the second target participant 102b may generate a second private key share using $a_2$=JVRSS(2) for participant 2, and so on.

Generating a first private key share $a_i$ using a joint secret share scheme may comprise generating a set of numbers $a_{1j} \in_R \mathbb{Z}_n \backslash \{0\}$, $\forall j=0, \ldots, t$, and then generating a first polynomial $f_1(x)=a_{10}+a_{11}x+ \ldots +a_{1t}x^t \mod n$, where the set of numbers are the coefficients of the polynomial. Each of the other participants 102, 104 may generate a respective polynomial using a respective set of numbers. For instance, the second target participant 102b generates a second polynomial $f_2(x)=a_{20}+a_{21}x+ \ldots +a_{2t}x^t \mod n$. The participants 102, 104 then transmit, to each other participant 102, 104, a value of their respective function evaluated at the index of that other participant 102, 104. For instance, the first participant 102a evaluates $f_1(2)$ for the second participant 102b and then transmits that value to the second participant 102b, evaluates $f_1(3)$ for the third participant 102c and then transmits that value to the third participant 102c, and so on. The first participant 102a obtains the respective values generated, as a function of the first participant's index, by the other participants 102. The values may be transmitted over the internet, or via other means.

The values may be transmitted via respective secure communication channels between respective pairs of the participants. Instead of transmitting directly, one or more participants 102, 104 (e.g. the first participant 102a) may broadcast their respective values. Having obtained at least the threshold number of values from at least the threshold number of participants, the first participant 102a generates the first private key share based on the first value and each other obtained data value, e.g. $f_2(1)$, $f_3(1)$, etc.

Each target participant 102 may calculate the corresponding public key a·G based on a set of obfuscated coefficients, where the coefficients are used to generate the respective private key shares $a_i$ of each participant 102. That is, when generating the ephemeral private key share $k_i$, each participant 102, 104 may share the obfuscated coefficients $a_{ij}$·G with each other participant 102, 104. The coefficients are obfuscated by a common generator point G on the chosen elliptic curve. These obfuscated coefficients may be transmitted between participants 102, 104 directly, or broadcast to the group. For instance, the first participant 102a may broadcast the obfuscated coefficients $a_{10}$·G, $a_{11}$·G, $a_{12}$·G, and so on. The public key corresponding to the private key may then be calculated as $$P = a \cdot G = \sum_{j=1}^{N}(a_{j0} \cdot G).$$

It will be appreciated that the corresponding public key need not be generated in order to generate the private key shares $a_i$, and as such this is an optional feature that the participants 102 may implement should they choose to. Note also that the public key may be generated by the target participants 102 and not the dummy participants 104, though they can if needed.

Note that the private key shares $a_i$ may be generated using an alternative method, i.e. not using the JVRSS method described above. Methods for generating shares of a private key are, in themselves, known in the art. Similarly, methods for distributing shares of a private key (or other such data) are, in themselves, known in the art. That being said, the private key share $a_i$ may be generated in a number of ways. For instance, a dealer (e.g. a trusted one of the target participants 102 or an independent party) may be used to generate and distribute one, some or all of the private key shares $a_i$, e.g. using a Shamir's secret sharing scheme. One such scheme that may be used for generating and distributing private key shares $a_i$ is described in WO2017145010A1.

Regardless of the particular method used to generate the private key shares, each of the target participants 102 and each of the dummy participants 104 has (e.g. stores) a respective private key share $a_i$ of the same private key a.

Each of the group of participants (i.e. each target participant 102 and each dummy participant 104) also has (e.g. stores in memory) a respective share $k_i$ of a shared ephemeral key k. For instance, the first target participant has a first ephemeral key share $k_1$, the second target participant has a second ephemeral key share $k_2$, and so on. The ephemeral key may have a threshold of t+1. The shares of the shared ephemeral key may be generated using JVRSS, Shamir's secret sharing scheme, or an alternative technique. The target participants 102 generate a public key corresponding to the shared ephemeral key. The dummy participants 104 are not required to generate this ephemeral public key.

As well as a respective private key share and a respective ephemeral key share, each of the target participants also has (e.g. stores in memory) a first component (a "first signature component") of the threshold signature. This is sometimes known as the r value. For completeness, the second signature component is sometimes known as the s value, and will be described in detail below. The first signature component is based on the public key corresponding to the shared ephemeral key, and more specifically, based on the x-component of the public key corresponding to the shared ephemeral key. For instance, the first signature component may be calculated as r=x mod n.

Note that instead of or in addition to storing their respective share of the shared ephemeral key, some or all of the group of participants may store the inverse share $k_i^{-1}$ of the shared ephemeral key. In some examples, this is calculated as $k_i^{-1}$=INVSS(i).

Each of the group of participants (i.e. each target participant 102 and each dummy participant 104) also has (e.g. stores in memory) a respective share $\alpha_i$ of a first blinding key a and a respective share $\beta_i$ of a second blinding key β. A blinding key share is used to obfuscate or otherwise "blind" or "hide" another key share or data item. That is, a blinding key share may be applied to a first key share to hide the first key share, such that the resulting key share can be shared without revealing the first key share. In a naïve example, the first key share may be 100 and the blinding key share may be 74, allowing the number 174 to be shared. Now, without knowing that the blinding key share is 74, a recipient could not know for sure the first key share. It will be appreciated that in reality the key shares may be much larger numbers. The blinding key shares may be generated using JVRSS or an alternative technique. Each blinding key may have a threshold of t+1.

Now follows a description of how each target participant 102 may generate a respective share $s_i$ of the second signature component s.

The participants (target 102 and dummy 104) begin by generating a respective share $\mu_i$ of a first intermediate key μ. Each participant 102, 104 generates their respective share $\mu_i$ of the first intermediate key μ based on (i.e. as a function of) their respective share $k_i$ of the ephemeral key and their respective share $\alpha_i$ of the first blinding key. For instance, the share of the ephemeral key and the share of the first blinding key may be combined by multiplication, in which case the first intermediate key may also be referred to as a multiplicative key. Each target participant 102 then sends their respective share $\mu_i$ of the first intermediate key to each of the other target participants 102. The dummy participants 104 also send their respective share $\mu_i$ of the first intermediate key μ to the target participants 102. The target participants 102 do not send (or at least do not need to send) their respective shares to the dummy participants 104. Similarly, the dummy participants 104 do not share their respective share $\mu_i$ of the first intermediate key with each other.

The target participants 102 then generate the first intermediate key μ based on the respective shares $\mu_i$ of the first intermediate key. E.g. the first target participant 102a generates a share $\mu_1$ of the first intermediate key, receives shares $\mu_i$ from the other participants 102, 104, and then constructs the first intermediate key based on those shares.

Constructing the first intermediate key $\mu$ may comprise interpolating over the respective shares $\mu_i$ of the first intermediate key. In examples where the ephemeral key and first blinding key of threshold t+1, the first intermediate key $\mu$ will have a higher threshold of 2t+1, meaning at least 2t+1 participants are required in order to generate the first intermediate key.

Having calculated the first intermediate key $\mu$, each target participant 102 generate a respective share $k_i^{-1}$ of an inverse of the ephemeral private key ("an inverse ephemeral key share) based on an inverse of the first intermediate key $\mu^{-1}$ and the respective share $\alpha_i$ of the first blinding key. In examples, since the dummy participants 104 do not calculate the first intermediate key, the dummy participants 104 are not able to calculate inverse ephemeral key shares.

Each participant (both the target participants 102 and the dummy participants 104) generate a respective share $\lambda_i$ of a second intermediate key $\lambda$. The shares $\lambda_i$ of the second intermediate key $\lambda$ are based on a respective share $\alpha_i$ of the first blinding key, a respective share $\beta_i$ of the second blinding key and a respective share $a_i$ of the shared private key. For instance, the respective share of the first blinding key and the respective share of the shared private key may be combined by multiplication and added to the respective share of the second blinding key. The key shares $\lambda_i$ may be combined in other ways to generate the respective share of the second intermediate key. Like the shares of the first intermediate key, the target participants 102 share their respective key shares $\lambda_i$ with each other. The dummy participants 104 also send their respective key shares $\lambda_i$ to the target participants 102. The target recipients 102 do not send their respective key shares $\lambda_i$ to the dummy participants 104, and the dummy participants 104 do not share the key shares $\lambda_i$ amongst themselves.

The target participants 102 then generate the second intermediate key $\lambda$ based on the respective shares $\lambda_i$ of the second intermediate key. E.g. the first target participant 102a generates a share of the second intermediate key, receives shares from the other participants 102, 104, and then constructs the second intermediate key $\lambda$ based on those shares. Constructing the second intermediate key $\lambda$ may comprise interpolating over the respective shares of the second intermediate key. In examples where the first blinding key and the shared private key have a threshold t+1, the second intermediate key will have a higher threshold of 2t+1, meaning at least 2t+1 participants are required in order to generate the second intermediate key.

In some embodiments, the target participants 102 then generate a pre-signature share $\sigma_i$ based on some of the shares calculated so far. In other embodiments, one or more of the shares calculated above are updated before generating the pre-signature share. The former will be described first.

In some embodiments, each target participant 102 generates a respective pre-signature share $\sigma_i$ based on the first component of the signature (the "r value"), the inverse $\mu^{-1}$ of the first intermediate key, the second intermediate key $\lambda$ and the respective share of the second blinding key $\beta_i$. Thus each target participant's respective pre-signature share $\sigma_i$ differs only in that the respective share of the second blinding key used to calculate the respective pre-signature share is different. The respective share of the second blinding key may be subtracted from the second intermediate key, and the result multiplied by the r-value and the inverse of the first intermediate key.

In other embodiments, the respective share of the second blinding key may be updated before generating the respective pre-signature share. The pre-signature share may then be generated in the same way as just described, except with the updated share of the second blinding key rather than the existing key share. The skilled person will be familiar with how to update a key share per se. Updating a key share does not affect the key itself. That is, the value of the key remains the same. An example technique for updating key shares is described below.

Note that since the pre-signature share does not require knowledge of the message, the pre-signature share can be pre-calculated. In other words, the pre-signature share may be generated before obtaining the message. Therefore a plurality of different pre-signature shares may be pre-calculated, each for use in generating a different respective share of the second signature component for signing different messages.

Having calculated the respective pre-signature share, each target participant 102 may then generate the respective share of the second component of the signature based on the inverse ephemeral key share $k_i^{-1}$, the pre-signature share $\sigma_i$, and the message to be signed, e.g. a hash of the message. Alternatively, the target participants 102 may update the ephemeral key share, and generate the respective share of the second signature component based on the updated inverse ephemeral key share, the pre-signature share $\sigma_i$, and the message to be signed, e.g. a hash of the message.

The target participants 102 may then send the shares $s_i$ of the second signature component to the coordinator 101 for generating the signature. That is, the coordinator 101 generate the second signature component s based on the shares of the second signature component, e.g. by interpolating over the shares $s_i$. The threshold signature is then formed of the first and second signature components (r,s). As mentioned above, in some examples the coordinator 101 may be one of the target participants, e.g. the first target participant 102a.

The coordinator 101 may then broadcast or transmit the signature to one or more other entities. Additionally or alternatively, the coordinator may store the signature, and/or record the signature as part of a digital record, e.g. in an email or other document. For example, the message may be part or all of a blockchain transaction. The signature may be included in that blockchain transaction (if the message is only part of the blockchain transaction), or in a different blockchain transaction.

Returning now to the updating of key shares. An example method that may be used to update the key shares is described in international patent application PCT/EP2021/062941. As mentioned, the pre-signature share may be calculated by each target participant 102 based on an updated share of the second blinding key. To update the respective shares of the second blinding key, each target participant 102 performs the following process. First, the target participants 102 generate shares of a third blinding key, e.g. using JVRSS or an alternative technique such as SSSS. Each target participant 102 then masks their respective share of the second blinding key using the respective share of the third blinding key, e.g. by adding together (or subtracting) the respective shares of the second and third blinding keys.

The masked shares of the second blinding key are shared amongst (i.e. sent to) the other target participants 102. A masked version of the second blinding key is then generated based on the shares of the masked blinding key. Having generated the masked blinding key, each target participant 102 then obtains an updated share of the second blinding key based on the masked blinding key and the respective share of the third blinding key, e.g. by subtracting one from the other.

The same process may be used to update the ephemeral private key shares. A fourth blinding key may be used instead of the third blinding key.

In general, embodiments of the present invention may be used to generate a signature on (i.e. for) any message. As a particular example use case, the message may be part or all of a blockchain transaction. That is, the signature may be used to sign one or more inputs and/or one or more outputs of a blockchain transaction. For instance, the generated signature may be used, at least in part, to unlock an output of a blockchain transaction. As a particular example, the output of a previous transaction may be a pay-to-public-key-hash (P2PKH) output which is locked to a hash of a public key. In order to be unlocked, an input of a later transaction that references the P2PKH output needs to include the (unhashed) public key and a signature generated based on the private key corresponding to the public key.

Represented in script, the "locking script" and "unlocking script" may take the following forms:

Locking script = OP_DUPOP_HASH160 < Public KeyHash >

OP_EQUALOP_CHECKSIG

Unlocking script = < Signature > < Public Key >

Referring to the above described embodiments, the <Public Key> may be equated to P=a·G, and the <Signature> comprises the threshold signature s, where the previous transaction is the message to be signed. Note that as stated above, ECDSA signatures are in the form (r,s).

Note that the described signature generation method is not limited to any particular use case and may in general be used for generating a signature based on any message. Signing all or part of a blockchain transaction is just one illustrative example. The described method may be used to sign and/or authorise, for instance, a legal document (e.g. a will, deed or other contract), correspondence between one or more parties, digital certificates (e.g. issued by a certificate authority), medical prescriptions, a bank transfer or a financial instrument, a mortgage or loan applications, etc.

As a particular example, the group of participants (say five participants in total) may form the Board of a company. Voting matters of the company may require a majority of the Board (i.e. at least three participants) to agree on the particular vote. The Board may use the described signature generation method to prove that at least three Board members agreed to vote in favour of a particular outcome. In this example, the threshold of the signature generation scheme is three. That is, at least three of the Board members must provide a respective signature share in order for the co-ordinator to successfully generate a signature. If a signature is generated successfully, at least the threshold number (i.e. three) of Board members must have agreed to vote in favour of that outcome. Thus the successful generation of a signature acts as a record of the vote and proves that a majority of the Board voted in a particular way.

Another use case for the present invention lays in the field of digital certificates, e.g. digital certificate issued by the X.509 standard. A digital certificate contains a signature that signs over some data. The data can in general be any data, but one particular example of data included in a digital certificate is a public key. A public key in a digital certificate is often referred to as a "certified public key". The issuer of the digital certificate (a "certificate authority") may perform one or more checks on the owner of the public key (e.g. know-your-customer checks), and if the checks are successful, the certificate authority issues a digital certificate that includes the certified public key. A user can use a certified public key to prove they are who they say they are, e.g. by signing a message with a private key corresponding to the certified public key.

One particular use for certificate authorities is to sign certificates used in HTTPS for secure browsing on the internet. Another common use is in issuing identity cards by national governments for use in electronically signing documents. The certificate authority signs the public key (or any other data to be attested to) using a private key.

FIG. 2 shows a flow chart illustrating an example method 200 for generating a signature according to the described embodiments. The method 200 may be begin, at step S201, with each participant 102, 104 setting up the required key shares, e.g. the private key shares, the ephemeral key shares, and the blinding key shares. At step S202, the target participants 102 generate the first intermediate key based on first intermediate key shares generated by the target participants 102 and the dummy participants 104. At step S203, the target participants 102 generate the second intermediate key based on second intermediate key shares generated by the target participants 102 and the dummy participants 104. At step S204, each target participant 102 generates a message-independent pre-signature share. At step S205, each target participant 102 generates a signature share (or rather, a share of a second component of the signature) based on the pre-signature share. At step S206, a coordinator 101 generates the signature based on the threshold umber of signature shares.

3. Method for Simulating a t+1 of N<2t+1 Scheme

The described embodiments may be used to simulate a t+1 of N<2t+1 scheme. For instance, the signature scheme may require at least 2t+1 participants, whereas the target group may consist of only t+1 participants.

In order to replicate a scheme with a smaller group size than 2t+1, the scheme must begin with a group of 2t+1 where up to t of the other participants are 'dummy' participants, such as service providers or trusted third parties (TTP) that offer this as a service. We assume that all secret shares and the relevant private data generated by each dummy participant will not be compromised and will be deleted immediately after the setup phase. This can be achieved by the dummy participants being independent of the scheme (i.e. target) participants. It may be that a TTP provides the service of all the dummies.

To create a shared secret of threshold (t+1) in a group of N<2t+1 participants, where the signing threshold is also (t+1), the following steps are performed. First assume that 'all participants' refers to the N 'scheme' participants plus the N' 'dummy' participants, making the total number of participants N+N'=2t+1.

All participants begin by setting up their private key shares and corresponding public key.
1. All participants calculate the shared private key using JVRSS, where each participant i has a secret key share $a_i$.
2. The scheme participants calculate the corresponding public key P. The dummy participants do not need to calculate the public key.

3. All participants calculate a shared ephemeral key as described in the introduction, where the participants have shares $k_i$ with a threshold of (t+1).
4. The scheme participants calculate the corresponding r value for this ephemeral key.
5. All participants execute JVRSS for a blinding secret $\alpha$, so that the participants have shares $\alpha_i$=JVRSS(i).
6. All participants calculate the multiplicative share $\mu_i = \alpha_i k_i$.
7. Each participant broadcasts this to the scheme participants only. That is, the dummy participants do not receive any shares.
8. Scheme participants calculate the multiplicative value $\mu$=interpolate($\mu_1, \ldots, \mu_{2t+1}$)t+using all the shares and calculates their inverse key share ($k_i^{-1} = \mu^{-1}\alpha_i$).
9. All participants create another shared secret so that each participant i has share $\beta_i$=JVRSS(i), with the shared secret having a threshold (t+1).
10. All participants then calculate the intermediary share $\lambda_i = \alpha_i a_i + \beta_i$. This value has a threshold of (2t+1). These shares are calculated with $\alpha_i$ instead of $k_i^{-1}$ as the dummy participants do not have knowledge of (k$\alpha$) to be able to calculate the inverse ephemeral key share.
11. All participants broadcast their intermediary share $\lambda_i$ to the N scheme participants. Again, the dummy participants do not receive any shares themselves.
12. Each scheme participant calculates the intermediary value using interpolation over (2t+1) shares $\lambda$=interpolate($\lambda_1, \ldots, \lambda_{2t+1}$)=$\alpha a + \beta$.
13. Each scheme participant i updates the $\beta_i$, $k_i^{-1}$ and $a_i$ shares using the method in section 3.2.1., essentially 'removing' the dummy participants. This results in the updated shares $\beta'_i$, $k'^{-1}_i$, and $a'_i$. Note that $\alpha_i$ does not need to be updated as it is no longer used. The private key shares are also not used again in this signature but may be in future signatures, so it is updated. To update the shares of $\beta 1$, take the following steps. To update
 a. Create a blinding shared secret K using JVRSS so that participant i has a share $\kappa_i$.
 b. Each participant i calculates $\beta_i + \kappa_i$ and broadcasts this.
 c. Each participant interpolates over the shares $\beta'$=interpolate($\beta_1 + \kappa_1, \ldots$).
 d. Each participant calculates their updated share $\beta'_i = \beta - \kappa_i$.

This is repeated for updating the other shared secret shares $k_i^{-1}$ and $a_1$.

14. All participants delete old shares. Since this scheme is secure against a maximum of t dishonest participants, this assumption is safe as there would be a maximum of t shares remaining if all honest participants delete their shares, which is not enough to uniquely determine any shared secret.
15. Each scheme participant i calculates their pre-signature share $\sigma_i = r\rho^{-1}(\lambda - \beta'_i) = r(k\alpha)^{-1}((\alpha a + \beta) - \beta'_i)$.
16. Each scheme participant i stores (r, $k'^{-1}_i$, $\beta_i$), and the private key share ($a'_i$, P).

In order to sign a message msg, at least (t+1) participants do the following steps.

17. A coordinator sends a request to at least (t+1) participants to create a signature share on the message msg.
18. Each scheme participant i calculates the message digest e=hash(msg). Recall that in Bitcoin, this hash function is the double SHA-256 hash function.
19. Each scheme participant i calculates their signature share $s_i = k'^{-1}_i e + \sigma_i$.
20. All signing participants send their signature share (r, $s_i$) to the coordinator.
21. The coordinator calculates s=interpolate($s_1, \ldots, s_{t+1}$)=$k^{-1}(e+ar)$ as required, and finally the signature is (r,s).

In order to achieve a threshold optimal scheme for group size less than the required 2t+1, the scheme requires 2t+1−N dummy participants which are then treated as participants leaving the scheme after their shares have been used for the required calculations. In particular, the dummies do not need to have knowledge of the result k$\alpha$ or $\lambda$. These values can be added into the calculation at later stages as described in the previous section. The reason behind updating the shares is to prevent attackers from obtaining shares from the dummy participants, and then only requiring less than a threshold number of scheme participants to obtain enough information to create any of the shared secrets. By updating the shares, this removes the dummy participants from the scheme.

Note that the same effect can be achieved by requiring that the dummy participants delete their shares after step 12. However, updating the shares allows the scheme participants to be certain that the shares held by the dummy participants are rendered invalid, providing more assurance to the scheme participants.

After removal of the dummy participants, if more calculations are required with the threshold of 2t+1 the participants can again update their shares to bring dummy participants into the scheme, do the required calculations, and remove the dummies again. These do not need to be the same dummy participants.

4. Further Remarks

It will be appreciated that the above embodiments have been described by way of example only. More generally there may be provided a method, apparatus or program in accordance with any one or more of the following Statements.

Statement 1. A computer-implemented method of generating a share of a threshold signature, wherein a group of participants comprises a set of target participants and a set of dummy participants, wherein the number of target participants is less than the number of participants required to generate a valid signature, wherein each target participant and each dummy participant has i) a respective share of a first private key, ii) a respective share of an ephemeral private key, iii) a respective share of a first blinding key, iv) a respective share of a second blinding key, and wherein each target participant has v) an ephemeral public key corresponding to the ephemeral private key, and wherein the method is performed by a first one of the target participants and comprises:

generating a first component of the threshold signature based on the ephemeral public key;

generating a respective share of a first intermediate key based on the respective share of the ephemeral private key and the respective share of the first blinding key, and obtaining a respective share of the first intermediate key from each other target participant and each dummy participant;

generating the first intermediate key based on the respective shares of the first intermediate key;

generating a respective share of an inverse ephemeral private key based on an inverse of the first intermediate key and the respective share of the first blinding key;

generating a respective share of a second intermediate key based on the respective share of the first private key, the respective share of the first blinding key, and the respective share of the second blinding key, and obtaining a respective share of the second intermediate key from each other target participant and each dummy participant;

generating the second intermediate key based on the respective shares of the second intermediate key;

generating a respective share of a pre-signature value based on the first component of the threshold signature, the inverse of the first intermediate key, the second intermediate key and the respective share of the second blinding key; and generating a respective second component of the threshold signature based on the respective share of the inverse ephemeral private key, the respective share of the pre-signature value, and a message.

Statement 2. The method of statement 1, comprising making the respective second component of the threshold signature available to a coordinator for generating the threshold signature.

Statement 3. The method of statement 1, comprising:
obtaining a respective second component of the threshold signature from one or more other target participants; and
generating the second component of the threshold signature for generating the threshold signature.

Statement 4. The method of any preceding statement, wherein the ephemeral private key, the first blinding key, the second blinding key and the second component of the threshold signature have a first threshold, and wherein the first intermediate key and the second intermediate key have a second, higher threshold.

Statement 5. The method of any preceding statement, comprising updating the respective share of the second blinding key, and wherein the respective share of the pre-signature value is based on the updated respective share of the second blinding key.

Statement 6. The method of any preceding statement, wherein updating the respective share of the second blinding key comprises:
generating a respective share of a third blinding key;
generating a respective share of a masked second blinding key based on the respective share of the second blinding key and the respective share of the third blinding key, and obtaining a respective share of the masked second blinding key from each other target participant;
generating the masked second blinding key based on the respective shares of the masked second blinding key; and
generating the updated respective share of the second blinding key based on the masked second blinding key and the respective share of the third blinding key.

Statement 7. The method of any preceding statement, comprising updating the respective share of the inverse ephemeral private key, and wherein the respective second component of the threshold signature is based on the updated respective share of the inverse ephemeral private key.

Statement 8. The method of statement 7, wherein updating the respective share of the inverse ephemeral key comprises:
generating a respective share of a fourth blinding key;
generating a respective share of a masked inverse ephemeral key based on the respective share of the inverse ephemeral key and the respective share of the fourth blinding key, and obtaining a respective share of the masked inverse ephemeral key from each other target participant;
generating the masked inverse ephemeral key based on the respective shares of the masked inverse ephemeral key; and
generating the updated respective share of the inverse ephemeral key based on the masked inverse ephemeral key and the respective share of the fourth blinding key.

Statement 9. The method of any preceding statement, comprising sending the respective share of the first intermediate key to each other target participant.

Statement 10. The method of any preceding statement, comprising sending the respective share of the second intermediate key to each other target participant.

Statement 11. The method of any preceding statement, wherein the respective share of the first intermediate key is based on a multiplication of the respective share of the ephemeral private key and the respective share of the first blinding key.

Statement 12. The method of any preceding statement, wherein the respective share of the second intermediate key is based on at least a multiplication of the respective share of the first blinding key and the respective share of the first private key.

Statement 13. The method of statement 2 or any statement dependent thereon, comprising receiving the message from the coordinator.

Statement 14. The method of statement 13, comprising generating the respective share of the pre-signature value prior to receiving the message from the coordinator.

Statement 15. The method of any preceding statement, wherein any one or more of the following are generated using a joint verifiable random secret sharing, JVRSS, scheme: the respective share of the first private key, the respective share of the ephemeral private key, the respective share of the first blinding key, and the respective share of the second blinding key.

Statement 16. The method of any preceding statement, wherein the message comprises at least part of a blockchain transaction.

Statement 17. The method of statement 3 and statement 16, comprising:
adding the threshold signature to the blockchain transaction; and
submitting the blockchain transaction to the blockchain network.

Statement 18. Computer equipment comprising:
memory comprising one or more memory units; and
processing apparatus comprising one or more processing units, wherein the memory stores code arranged to run on the processing apparatus, the code being configured so as when on the processing apparatus to perform the method of any preceding statement.

Statement 19. A computer program embodied on computer-readable storage and configured so as, when run on computer equipment, to perform the method of any of statement 1 to 17.

According to another aspect disclosed herein, there may be provided a method comprising the actions of each target participant.

According to another aspect disclosed herein, there may be provided a system comprising the computer equipment of each target participant.

According to another aspect disclosed herein, there may be provided a method comprising the actions of each target participant and each dummy participant.

According to another aspect disclosed herein, there may be provided a system comprising the computer equipment of each participant target participant and each dummy participant.

Other variants or use cases of the disclosed techniques may become apparent to the person skilled in the art once given the disclosure herein. The scope of the disclosure is not limited by the described embodiments but only by the accompanying claims.

The invention claimed is:

1. A computer-implemented method of generating a share of a threshold signature, wherein a group of participants comprises a set of target participants and a set of dummy participants, wherein a number of target participants is less than the number of participants required to generate a valid signature, wherein each target participant and each dummy participant has i) a respective share of a first private key, ii) a respective share of an ephemeral private key, iii) a respective share of a first blinding key, iv) a respective share of a second blinding key, and wherein each target participant has v) an ephemeral public key corresponding to the ephemeral private key, and wherein the method is performed by a first one of the target participants and comprises:
generating a first component of the threshold signature based on the ephemeral public key;
generating a respective share of a first intermediate key based on the respective share of the ephemeral private key and the respective share of the first blinding key, and obtaining a respective share of the first intermediate key from each other target participant and each dummy participant;
generating the first intermediate key based on the respective shares of the first intermediate key;
generating a respective share of an inverse ephemeral private key based on an inverse of the first intermediate key and the respective share of the first blinding key;
generating a respective share of a second intermediate key based on the respective share of the first private key, the respective share of the first blinding key, and the respective share of the second blinding key, and obtaining a respective share of the second intermediate key from each other target participant and each dummy participant;
generating the second intermediate key based on the respective shares of the second intermediate key;
generating a respective share of a pre-signature value based on the first component of the threshold signature, the inverse of the first intermediate key, the second intermediate key and the respective share of the second blinding key; and
generating a respective second component of the threshold signature based on the respective share of the inverse ephemeral private key, the respective share of the pre-signature value, and a message.

2. The method of claim 1, comprising making the respective second component of the threshold signature available to a coordinator for generating the threshold signature.

3. The method of claim 2, comprising receiving the message from the coordinator.

4. The method of claim 3, comprising generating the respective share of the pre-signature value prior to receiving the message from the coordinator.

5. The method of claim 1, comprising:
obtaining a respective second component of the threshold signature from one or more other target participants; and
generating the second component of the threshold signature for generating the threshold signature.

6. The method of claim 5, wherein the message comprises at least part of a blockchain transaction, and wherein the method comprises:
adding the threshold signature to the blockchain transaction; and
submitting the blockchain transaction to a blockchain network.

7. The method of claim 1, wherein the ephemeral private key, the first blinding key, the second blinding key and the second component of the threshold signature have a first threshold, and wherein the first intermediate key and the second intermediate key have a second, higher threshold.

8. The method of claim 1, comprising updating the respective share of the second blinding key, and wherein the respective share of the pre-signature value is based on the updated respective share of the second blinding key.

9. The method of claim 1, wherein updating the respective share of the second blinding key comprises:
generating a respective share of a third blinding key;
generating a respective share of a masked second blinding key based on the respective share of the second blinding key and the respective share of the third blinding key, and obtaining a respective share of the masked second blinding key from each other target participant;
generating the masked second blinding key based on the respective shares of the masked second blinding key; and
generating the updated respective share of the second blinding key based on the masked second blinding key and the respective share of the third blinding key.

10. The method of claim 1, comprising updating the respective share of the inverse ephemeral private key, and wherein the respective second component of the threshold signature is based on the updated respective share of the inverse ephemeral private key.

11. The method of claim 10, wherein updating the respective share of the inverse ephemeral key comprises:
generating a respective share of a fourth blinding key;
generating a respective share of a masked inverse ephemeral key based on the respective share of the inverse ephemeral key and the respective share of the fourth blinding key, and obtaining a respective share of the masked inverse ephemeral key from each other target participant;
generating the masked inverse ephemeral key based on the respective shares of the masked inverse ephemeral key; and
generating the updated respective share of the inverse ephemeral key based on the masked inverse ephemeral key and the respective share of the fourth blinding key.

12. The method of claim 1, comprising sending the respective share of the first intermediate key to each other target participant.

13. The method of claim 1, comprising sending the respective share of the second intermediate key to each other target participant.

14. The method of claim 1, wherein the respective share of the first intermediate key is based on a multiplication of the respective share of the ephemeral private key and the respective share of the first blinding key.

15. The method of claim 1, wherein the respective share of the second intermediate key is based on at least a multiplication of the respective share of the first blinding key and the respective share of the first private key.

16. The method of claim 1, wherein any one or more of the following are generated using a joint verifiable random secret sharing, JVRSS, scheme: the respective share of the first private key, the respective share of the ephemeral private key, the respective share of the first blinding key, and the respective share of the second blinding key.

17. The method of claim 1, wherein the message comprises at least part of a blockchain transaction.

18. Computer equipment, comprising:
memory comprising one or more memory units; and
processing apparatus comprising one or more processing units, wherein the memory stores code arranged to run on the processing apparatus, the code being configured so as when run on the processing apparatus, the processing apparatus performs a method of generating a share of a threshold signature, wherein a group of participants comprises a set of target participants and a set of dummy participants, wherein a number of target participants is less than the number of participants required to generate a valid signature, wherein each target participant and each dummy participant has i) a respective share of a first private key, ii) a respective share of an ephemeral private key, iii) a respective share of a first blinding key, iv) a respective share of a second blinding key, and wherein each target participant has v) an ephemeral public key corresponding to the ephemeral private key, and wherein the method is performed by a first one of the target participants and comprises:
generating a first component of the threshold signature based on the ephemeral public key;
generating a respective share of a first intermediate key based on the respective share of the ephemeral private key and the respective share of the first blinding key, and obtaining a respective share of the first intermediate key from each other target participant and each dummy participant;
generating the first intermediate key based on the respective shares of the first intermediate key:
generating a respective share of an inverse ephemeral private key based on an inverse of the first intermediate key and the respective share of the first blinding key;
generating a respective share of a second intermediate key based on the respective share of the first private key, the respective share of the first blinding key, and the respective share of the second blinding key, and obtaining a respective share of the second intermediate key from each other target participant and each dummy participant;
generating the second intermediate key based on the respective shares of the second intermediate key:
generating a respective share of a pre-signature value based on the first component of the threshold signature, the inverse of the first intermediate key, the second intermediate key and the respective share of the second blinding key; and
generating a respective second component of the threshold signature based on the respective share of the inverse ephemeral private key, the respective share of the pre-signature value, and a message.

19. A computer program embodied on non-transitory computer-readable storage media and configured so as, when run on computer equipment, the computer equipment performs a method of generating a share of a threshold signature, wherein a group of participants comprises a set of target participants and a set of dummy participants, wherein a number of target participants is less than the number of participants required to generate a valid signature, wherein each target participant and each dummy participant has i) a respective share of a first private key, ii) a respective share of an ephemeral private key, iii) a respective share of a first blinding key, iv) a respective share of a second blinding key, and wherein each target participant has v) an ephemeral public key corresponding to the ephemeral private key, and wherein the method is performed by a first one of the target participants and comprises:
generating a first component of the threshold signature based on the ephemeral public key;
generating a respective share of a first intermediate key based on the respective share of the ephemeral private key and the respective share of the first blinding key, and obtaining a respective share of the first intermediate key from each other target participant and each dummy participant;
generating the first intermediate key based on the respective shares of the first intermediate key:
generating a respective share of an inverse ephemeral private key based on an inverse of the first intermediate key and the respective share of the first blinding key;
generating a respective share of a second intermediate key based on the respective share of the first private key, the respective share of the first blinding key, and the respective share of the second blinding key, and obtaining a respective share of the second intermediate key from each other target participant and each dummy participant;
generating the second intermediate key based on the respective shares of the second intermediate key;
generating a respective share of a pre-signature value based on the first component of the threshold signature, the inverse of the first intermediate key, the second intermediate key and the respective share of the second blinding key; and
generating a respective second component of the threshold signature based on the respective share of the inverse ephemeral private key, the respective share of the pre-signature value, and a message.

* * * * *